No. 719,951. PATENTED FEB. 3, 1903.
J. E. NORWOOD.
SIDE BEARING FOR CARS.
APPLICATION FILED JULY 24, 1901.
NO MODEL. 2 SHEETS—SHEET 1.

Witnesses.
Robert Garrett
Dennis Sumby

Inventor.
John E. Norwood.
By James L. Norris
Atty.

No. 719,951. PATENTED FEB. 3, 1903.
J. E. NORWOOD.
SIDE BEARING FOR CARS.
APPLICATION FILED JULY 24, 1901.
NO MODEL. 2 SHEETS—SHEET 2.
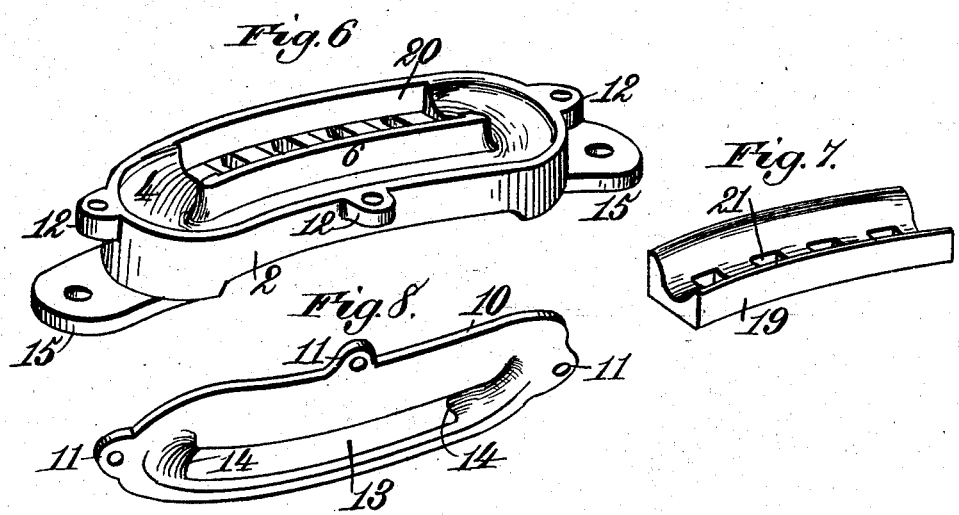
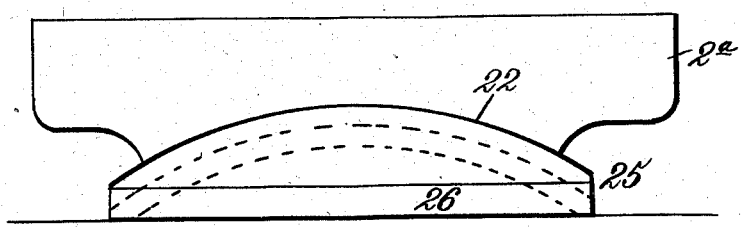
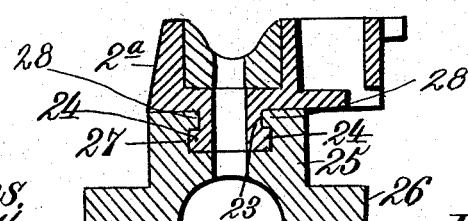
Witnesses
Robert Everett
Dennis Sumby
Inventor
John E. Norwood
By James L. Norris
Att'y

UNITED STATES PATENT OFFICE.

JOHN E. NORWOOD, OF BALTIMORE, MARYLAND, ASSIGNOR TO BALTIMORE BALL BEARING CO., OF BALTIMORE, MARYLAND, A CORPORATION OF MARYLAND.

SIDE BEARING FOR CARS.

SPECIFICATION forming part of Letters Patent No. 719,951, dated February 3, 1903.

Application filed July 24, 1901. Serial No. 69,597. (No model.)

*To all whom it may concern:*

Be it known that I, JOHN E. NORWOOD, a citizen of the United States, residing at Baltimore, in the State of Maryland, have invented new and useful Improvements in Side Bearings for Cars, of which the following is a specification.

My invention relates to that class of antifriction side bearings for railway-cars in which one of the members of the bearing is provided with an endless channel or race containing a continuous series or chain of balls or other analogous devices, the object of the invention being to provide means whereby that portion of the channel or race and the balls therein which is out of line with the coöperating member of the bearing may be permanently housed and protected from the access of dust, dirt, and the like.

A further object of the invention is to provide means whereby any dust, dirt, or other foreign matter which may gain access to the interior working parts of the bearing may be readily discharged therefrom.

A further object of the invention is to provide a removable wear or bearing plate for that portion of the ball-race which sustains the weight of the load on the bearing.

A further object of the invention is to provide novel means of mounting one of the members of the bearing to provide for a rocking or sliding motion of the same, so as to compensate for variations in the longitudinal inclination of the truck with respect to the body of the car.

Other objects and advantages of the invention will hereinafter appear, and the novel features thereof will be set forth in the claims.

Figure 1:
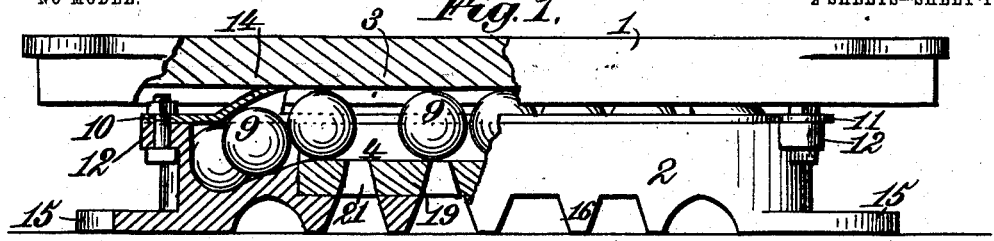
Figure 2:
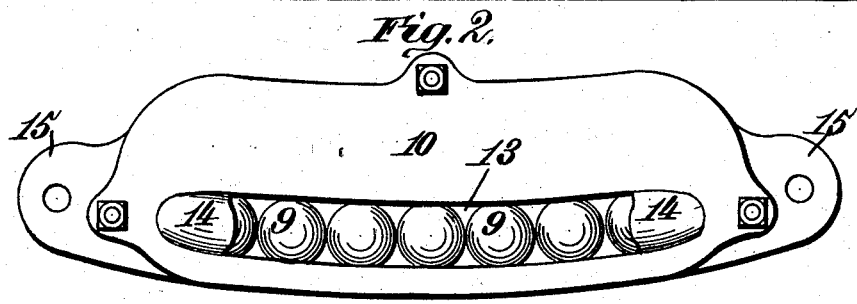
Figure 3:
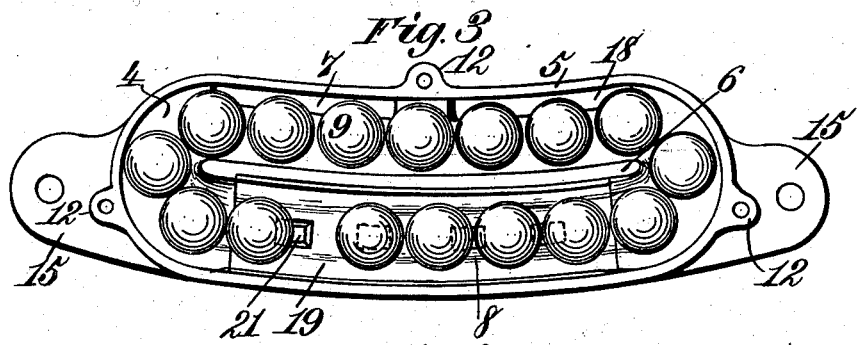
Figure 4:
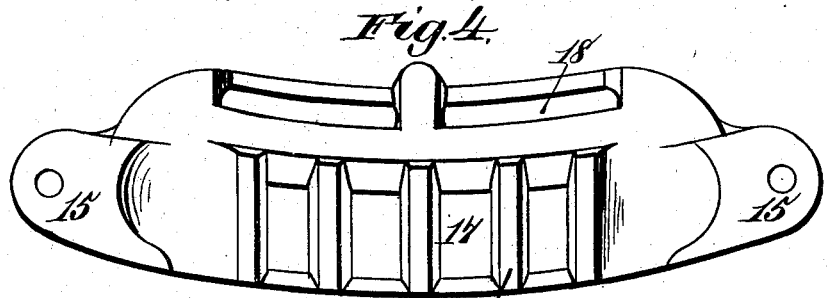
Figure 5:
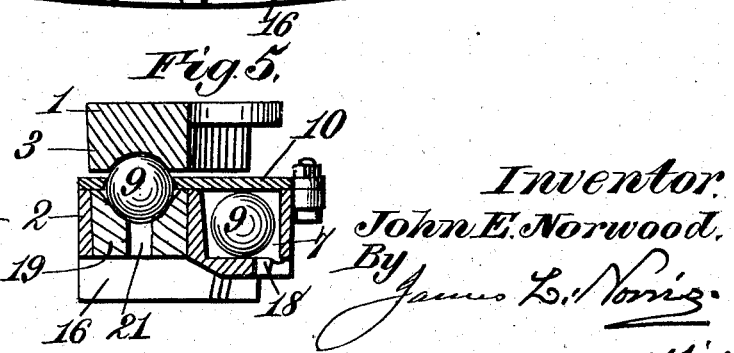

In the drawings, forming part of this specification and illustrating what I consider the best form and construction of my invention, Figure 1 is a side elevation, partly in longitudinal section, of my improved side bearing. Fig. 2 is a top plan view of the lower member of the same. Fig. 3 is a similar view with the lid or cover removed. Fig. 4 is a bottom plan view, and Fig. 5 is a transverse section of the same. Figs. 6, 7, and 8 are detail perspective views of the different parts of the lower member. Fig. 9 is a side elevation of a modified construction, and Fig. 10 is a cross-section of the same.

Like reference-numerals indicate like parts in the different views.

My improved side bearing is made up of the two members 1 and 2, respectively, the upper member 1 being designed to be secured to the under side of the body-bolster, and the lower member 2 being designed to be secured to the truck-bolster. The member 1 has been shown as provided with a longitudinally-extending groove or channel 3 on its under side to receive the balls; but it is obvious that this groove may be dispensed with, if desired, and said member or bearing-plate 1 be provided with a flat under surface.

The member 2 of the bearing is a casting, provided with an endless channel or ball-race 4, formed in the illustrated example of my invention by the flange or rib 5, extending entirely around the sides of said member and the central flange or rib 6. The opposite sides 7 and 8 of the channel 4 are preferably parallel to each other and are curved to conform to the arc of movement of the truck of the car with respect to the body. The side 8 of the channel is located in a higher plane than the side 7, and the bottom walls of the curved ends of said channel are inclined for an obvious purpose.

The balls 9, which are located in the channel or race 4 and which consist of an endless chain or series, are of such diameter that when they lie along the side 7 thereof the upper surfaces of the same will be at a point in the same plane with or slightly below the upper edge of the flange 5; but when they are located in the side 8 of said channel the upper surfaces thereof will project up beyond the flange 5. It will thus be seen that while a continuous series or chain of balls is employed in the channel 4 a portion of the same will be at a higher level than the other and constitute for the time being or while they are in the higher part of the channel the active moving ball-bearings.

A housing for the lower part of the channel or raceway and the balls as they pass therethrough is provided, and, as shown in the drawings, this housing consists of a plate or cover 10, resting upon the upper edges of the flange 5 and having ears or projections 11 thereon, through which securing-bolts, extending through ears 12 on the member 2' pass. The mouth of the higher portion of the channel or raceway is contracted or restricted to prevent accidental escape of the balls during the process of assembling or otherwise by means of the cover or housing-plate 10, which extends over this portion of the channel or raceway and is provided with an elongated arc-shaped slot or opening 13, through which the balls in operation project. The said plate or cover is also provided at opposite ends of the slot or opening 13 with the raised portions 14, which serve to protect the balls 9 and the channel or race 4 from access of dust or dirt at the points where said balls pass into and from the slot or opening 13. It will be noted that the housing-plate or cover 10 serves, in connection with the member 2 of the bearing, as a complete housing for the balls 9 in the channel 4, except for those portions of the balls which are in actual use. The bearing plate or member 1 on the body-bolster of the car rests upon and moves in contact with the balls in the side 8 of the channel 4, and said bearing plate or member is made of such length that during the ordinary range of relative movement between the truck and the car-body said bearing plate or member 1 will completely cover the opening 13 in the cover 10 and the balls 9, which project through said opening, so that access of dust or dirt into the bearings is cut off. This is more effectually accomplished when the groove or channel 3 is provided in the bearing plate or member 1.

The member 2 of the bearing is provided with lugs or ears 15, upon which it rests and by means of which it may be secured to the truck-bolster. Said member 2 is also provided between the lugs or ears 15 with separated feet 16, whose lower surfaces lie in the same plane with each other and with the lower surfaces of said lugs. An escape for any dust, dirt, water, or other foreign matter that may pass into the higher side of the channel or raceway is provided and, as shown in the drawings, consists of openings 17 through the bottom wall of this part of the channel. An escape for a like object is also provided in the lower portion of the channel or raceway and consists, as shown in the drawings, of elongated openings 18, provided in the bottom wall of this portion of the channel or raceway.

As that portion of the channel or race 4 which lies directly beneath the opening 13 in the housing-plate or cover 10 is the only portion which receives any material wear or strain I have provided at this point a removable wear or bearing plate 19, preferably constructed of hardened steel and seated in a socket or recess 20 in the channel 4. The upper surface of the wear-plate 19 is longitudinally grooved for the reception of the balls 9, and the bottom wall of the same is provided with openings 21, which communicate with the openings 17 and provide for the escape of any accumulated dust or dirt therethrough. The wear-plate 19 and the socket or recess 20, in which it fits, are preferably rectangular in shape, so that it is merely necessary to insert the wear-plate in said socket and apply the balls 9 and cover 10, when the same will remain in place without other securing means. This wear-plate is an important feature in a device of this kind, as it enables the bearing to be practically renewed throughout by the renewal of a single inexpensive part. With all other bearings of this kind with which I am familiar it is necessary when the same is worn to entirely discard the same and substitute for it a new one. This is avoided by means of my invention. It should be stated in this connection that the grooves in the wear-plate 19 and in the member 1 of my improved bearing conform in transverse section to the curve or contour of the balls 9, which fit and move therein. By this construction an elongated bearing-surface for the balls is provided, which prevents the wear of said balls or of the parts coöperating therewith at one point only, causing the flattening of the balls or the uneven widening of the channels in which they move.

In Figs. 9 and 10 of the drawings I show a construction of the lower member $2^a$ of the bearing which provides for a longitudinal rocking or sliding connection between the same and the truck-bolster. The said member $2^a$ is in all respects the same as the member 2, heretofore described, except that the under side thereof is longitudinally concave, as shown at 22, which concave portion is provided with a downwardly-projecting rib 23, having lateral projections thereon forming the shoulders 24. The base-plate 25 is adapted to be secured to the truck-bolster by means of bolts or other analogous devices passing through the side flanges 26 thereof, and the upper surface of said base-plate is longitudinally convex to conform to the concave portion 22 of the member $2^a$ and has a groove or channel 27 therein to receive the rib 23 and inwardly-projecting shoulders 28, adapted to engage the shoulders 24. By this construction it will be seen that the member $2^a$ is capable of longitudinal rocking, sliding, or oscillating movement on the truck-bolster to compensate for variations in the longitudinal inclination of the truck with respect to the body—that is to say, the member $2^a$ of the bearing and the coöperating member 1 may be maintained in constant parallelism notwithstanding the fact that such parallelism is not maintained between the truck and the body thereon.

In assembling the two parts just described the rib 23 on the member $2^a$ is introduced into the groove or channel 27 in the base-plate 25 before the latter is secured to the truck-bolster. Afterward when the base-plate 25 is bolted down to the truck-bolster a permanent rocking connection between the member 2ª and the truck-bolster is provided, it being impossible to remove said member from the base-plate 25 without first removing the latter from the truck-bolster to which it is secured. As the ends of the channel 27 in the base-plate 25 are open, it will be obvious that during the rocking movement of the member 2ª on said base-plate the dirt which may gain access to the bearing parts will escape through the openings in the bottom of the channel 4 out through the ends of the channel 27.

It has heretofore been stated that the raised portions 14 at the ends of the slot or opening 13 in the cover 10 are provided for the purpose of protecting the balls 9 and the channel or race 4 from the access of dust or dirt. These raised portions also serve the function of guides for the balls 9 in passing to and from the side 8 of the channel 4 from and into the inclined curved ends of said channel. They also prevent any possibility of jamming between the balls and the ends of the slot or opening 13.

I desire it understood that while I have shown in my drawings what I consider that form or embodiment of my invention best known to me I do not restrict my invention to the details of form and construction otherwise than as may be set forth specifically in some of the following clauses of claim for the purposes of those claims only. My invention as defined in other of the clauses of claim is not restricted to such details. I desire it also distinctly understood that I claim herein, as to some of the clauses of claim, the novel ball-containing element of the complete bearing shown, whether it be used in connection with an upper plate or bearing member of the form shown in the drawings or an upper plate or bearing of any character or not.

Having now described my invention, what I claim as new, and desire to secure by Letters Patent, is—

1. In a side bearing for cars, the combination with an endless way composed of a high side, a low side, and inclined ends, of a continuous row of balls in said way, and a housing for the balls which are located in the low side of the way; substantially as described.

2. In a side bearing for cars, the combination of a casting provided with an endless channel or raceway, one portion of said channel or raceway being on a high plane, a continuous row of balls in said channel or raceway, the channel or raceway having a restricted mouth through which the balls in the high side thereof project, and a bottom for the low side of the channel or raceway for supporting the balls on that side.

3. A side bearing for cars, comprising the combination of a casting provided with an endless channel or raceway having a high side, a low side, and two inclined ends, a continuous row of balls in said channel or raceway, the high side of the channel or raceway having a restricted mouth, and a bottom for the low side of the channel or raceway to support the balls therein.

4. A side bearing for cars, comprising the combination of a casting provided with an endless channel or raceway having a high side, a low side, and two connecting inclined ways at the ends, a continuous row of balls in the said channel or raceway, and an escape for foreign matter.

5. A side bearing for cars comprising the combination of a casting provided with a continuous channel or raceway having a high portion and a low portion connected by inclined end portions, a continuous row of balls in said channel or raceway, a bottom for the low portion of the channel or raceway to support the balls therein, and an escape for foreign matter.

6. A side bearing for cars comprising an element having an endless channel or raceway, provided with a high portion, a low portion, and inclined end portions connecting the same, a continuous row of balls in said channel or raceway, and means for permitting the escape of foreign matter from said channel or raceway.

7. In a side bearing for cars, the combination with a casting provided with a channel or raceway, having a high side, a low side, and two inclined ends, of a continuous row of balls in said channel or raceway, a housing for the balls which are located in the low side of the channel or raceway, and a restricted mouth for the high side of the channel or raceway.

8. In a side bearing for cars, the combination with a casting provided with a channel or raceway, having a high side, a low side, and two inclined ends, of a continuous row of balls in said channel or raceway, a housing for the balls which are located in the low side of the channel or raceway, a restricted mouth for the high side of the channel or raceway, and a bottom for the low side of the channel or raceway for supporting the balls at that side.

9. In a side bearing for cars, the combination with a casting provided with a channel or raceway, having a high side, a low side, and two inclined ends, of a continuous row of balls in said channel or raceway, a housing for the balls which are located in the low side of the channel or raceway, a restricted mouth for the high side of the channel or raceway, a bottom for the low side of the channel or raceway for supporting the balls at that side, and an escape for foreign matter.

10. A side bearing for cars comprising a casting provided with an endless channel or raceway having a high side, a low side and two connecting inclined ways at the ends, the said channel having openings leading therefrom to the outside, for the escape of foreign matter, and a continuous row of balls in said channel.

11. A side bearing for cars, comprising two coöperating members capable of relative oscillating movements, one upon the other, the lower of said members being provided with an endless channel having one portion thereof higher than the other and containing antifrictional devices, and a cover secured to said lower member for inclosing and protecting the lower portion of said channel and having an elongated slot therein opposite the higher portion thereof through which a part of said antifrictional devices may project, and the upper of said members having a groove therein for receiving the antifrictional devices which project through the slot in said cover and being of such length as to constantly cover said slot, as and for the purpose set forth.

12. A side bearing for cars, comprising two coöperating members, the lower one of which is provided with transversely-extending ribs constituting feet and with an endless channel having one portion thereof higher than the other and having openings in the bottom thereof which communicate with the spaces between said feet, and means on the lower of said members for retaining antifrictional devices in place within said channel.

13. A side bearing for cars, comprising two coöperating members, the lower of which is provided with transversely-extending ribs constituting feet and with a channel having one portion thereof higher than the other, the higher portion of said channel having openings in the bottom thereof which communicate with the spaces between said feet and the lower portion of said channel having openings in the bottom thereof which discharge at one side of said feet, and means on the lower of said members for retaining antifrictional devices within said channel.

14. A side bearing for cars, comprising two coöperating members, the lower of which is provided with transversely-extending ribs constituting feet and with a channel having one portion thereof higher than the other, the higher portion of said channel having a socket therein and provided with openings in its bottom which communicate with the spaces between said feet, and the lower portion of said channel having elongated openings in the bottom thereof which discharge at one side of said feet, a removable wear-plate fitting within said socket and having openings therein which register with the openings in the bottom of the higher portion of said channel, and means on the lower of said members for retaining antifrictional devices in place within said channel.

15. A side bearing for cars, comprising two coöperating members, the lower of which is provided with a channel or race containing balls, and a cover for said channel secured to said lower member and having an elongated slot therein through which a portion of said balls project, the upper of said members being provided with a groove or channel on its under side in which the projecting balls fit and of such length as to constantly cover and protect said balls, and the said groove or channel being of substantially the same transverse curvature as said balls.

16. A side bearing for cars, comprising two coöperating members, the lower of which is provided with an endless channel or race containing a continuous series or chain of balls, said channel having one portion thereof higher than the other, and a plate or cover for said channel secured to said lower member and having an opening therein opposite the higher portion of said channel through which a portion of said balls project, the upper of said members moving in contact with the balls which project through said opening, having a groove therein to receive said balls of substantially the same transverse curvature as said balls and being of such length as to constantly cover and protect the same.

17. In an antifriction-bearing, two coöperating members, the lower of which is provided with a channel having openings in the bottom thereof and with transversely-extending ribs constituting feet, the spaces between said feet merging into said openings.

18. In an antifriction-bearing, two coöperating members, one of which is provided with a channel having openings in the bottom thereof, and with transversely-extending ribs constituting feet between which said openings discharge, and a removable wear-plate for said channel supported upon the upper sides of said ribs.

19. In an antifriction-bearing, two coöperating members, one of which has a sliding rocking connection with the part to which it is attached.

20. In an antifriction-bearing, two coöperating members, one of which is capable of sliding oscillating movement on the part to which it is attached.

21. In an antifriction-bearing, two coöperating members, and a fixed bracket to which one of said members is connected, the said member being capable of sliding rocking movement on said bracket.

22. In an antifriction-bearing, a bracket and a bearing member mounted thereon, one of said parts having a longitudinally-concave wall and the other of said parts having a longitudinally-convex wall, the said walls lying in contact with each other and providing a rocking connection between said bearing member and said bracket.

23. In an antifriction-bearing, two coöperating members, one of which is provided with a concave, longitudinally-extending wall, and a bracket having a longitudinally-extending convex wall against which the concave wall of said member bears and on which it is adapted to rock.

24. In an antifriction-bearing, two coöperating members, the lower of which is provided with a concave bottom wall and has a longitudinally-extending rib on the under side thereof provided with lateral shoulders, and a bracket having a convex upper wall provided with a channel or groove for receiving said rib, the said channel or groove having inwardly-extending shoulders thereon adapted to engage the shoulders on said rib.

In testimony whereof I have hereunto set my hand in presence of two subscribing witnesses.

JOHN E. NORWOOD.

Witnesses:
WM. M. STOCKBRIDGE,
GEO. W. REA.